US012776156B2

(12) United States Patent
Murozono et al.

(10) Patent No.: US 12,776,156 B2
(45) Date of Patent: Oct. 27, 2026

(54) IMAGE PROCESSING DEVICE, IMAGE PROCESSING METHOD, AND RECORDING MEDIUM

(71) Applicant: NEC Corporation, Tokyo (JP)

(72) Inventors: Kyoko Murozono, Tokyo (JP); Azusa Sawada, Tokyo (JP); Kenta Senzaki, Tokyo (JP); Hironobu Mori, Tokyo (JP); Katsuya Odaka, Tokyo (JP)

(73) Assignee: NEC CORPORATION, Tokyo (JP)

( * ) Notice: Subject to any disclaimer, the term of this patent is extended or adjusted under 35 U.S.C. 154(b) by 309 days.

(21) Appl. No.: 18/579,930

(22) PCT Filed: Aug. 31, 2022

(86) PCT No.: PCT/JP2022/032697
§ 371 (c)(1),
(2) Date: Jan. 17, 2024

(87) PCT Pub. No.: WO2023/053830
PCT Pub. Date: Apr. 6, 2023

(65) Prior Publication Data

US 2024/0331418 A1 Oct. 3, 2024

(30) Foreign Application Priority Data

Sep. 29, 2021 (JP) ................................ 2021-158568

(51) Int. Cl.
*G06V 10/00* (2022.01)
*G06V 10/25* (2022.01)
*G06V 20/70* (2022.01)

(52) U.S. Cl.
CPC ............. *G06V 20/70* (2022.01); *G06V 10/25* (2022.01)

(58) Field of Classification Search
CPC ...... G06V 10/25; G06V 10/85; G06V 10/761; G06V 10/762; G06V 10/764;
(Continued)

(56) References Cited

U.S. PATENT DOCUMENTS 7,577,290 B2 * 8/2009 Ikeda .................. G06V 40/171 382/167
8,934,673 B2 * 1/2015 Park .......................... G06T 7/11 382/103
(Continued)

FOREIGN PATENT DOCUMENTS

JP 2011-170418 A 9/2011
JP 2017-151876 A 8/2017
(Continued)

OTHER PUBLICATIONS

International Search Report for PCT Application No. PCT/JP2022/032697, mailed on Nov. 15, 2022.
(Continued)

*Primary Examiner* — Amir Alavi
(74) *Attorney, Agent, or Firm* — Sughrue Mion, PLLC

(57) ABSTRACT

This image processing device is configured to comprise a region setting unit, a standard image extraction unit, a data generation unit, and an output unit. The region setting unit sets, in an annotation target image, a region in which an annotation target object can be present as a candidate region. The standard image extraction unit extracts, from an image on which annotation has been completed, a standard image that is an image in which an object identical to the target object is captured. The data generation unit generates, as annotation data, data in which the annotation target image, a reference image which is captured of a region including the candidate region at a time different from the time when the annotation target image is captured, and the standard image
(Continued)

are associated with each other. The output unit outputs the generated annotation data generated.

20 Claims, 16 Drawing Sheets

(58) Field of Classification Search
CPC .. G06V 10/765; G06V 10/7715; G06V 10/82; G06V 20/70; G06F 16/583; G06T 7/00; G06T 7/60
See application file for complete search history.

(56) References Cited

U.S. PATENT DOCUMENTS

| | | | | |
|---|---|---|---|---|
| 9,264,577 | B2 * | 2/2016 | Shimahashi | H04N 1/047 |
| 9,501,554 | B2 * | 11/2016 | Chiba | G06F 18/24137 |
| 11,017,266 | B2 * | 5/2021 | Irshad | G06V 20/10 |
| 12,056,216 | B2 * | 8/2024 | Sawada | G06V 10/759 |
| 12,165,327 | B2 * | 12/2024 | Qi | G06N 3/09 |
| 2009/0123021 | A1 * | 5/2009 | Jung | G11B 27/28<br>707/999.102 |
| 2010/0070527 | A1 * | 3/2010 | Chen | G06F 16/70<br>707/E17.108 |
| 2024/0331418 | A1 * | 10/2024 | Murozono | G06T 7/60 |

FOREIGN PATENT DOCUMENTS

| | | | |
|---|---|---|---|
| JP | 2019-107084 | A | 7/2019 |
| JP | 2020-030730 | A | 2/2020 |
| JP | 2020-101968 | A | 7/2020 |
| WO | 2014/136327 | A1 | 9/2014 |
| WO | 2021/186672 | A1 | 9/2021 |

OTHER PUBLICATIONS

English translation of Written opinion for PCT Application No. PCT/JP2022/032697, mailed on Nov. 15, 2022.

P.F. Alcantarilla, J.Nuevo and A.Bartoli, "Fast Explicit Diffusion for Accelerated Features in Nonlinear Scale Spaces", Proceedings British Machine Vision Conference 2013, pp. 13.1-13.11.

Japanese Office Action for JP Application No. 2023-550483 mailed on Dec. 24, 2024 with English Translation.

* cited by examiner

IMAGE PROCESSING DEVICE, IMAGE PROCESSING METHOD, AND RECORDING MEDIUM

This application is a National Stage Entry of PCT/JP2022/032697 filed on Aug. 31, 2022, which claims priority from Japanese Patent Application 2021-158568 filed on Sep. 29, 2021, the contents of all of which are incorporated herein by reference, in their entirety.

TECHNICAL FIELD

The present invention relates to an image processing device and the like.

BACKGROUND ART

In order to effectively utilize satellite images and the like, various automatic analyses are performed. For automatic analysis of an image, development of an analysis method, and performance evaluation, image data prepared with a correct answer is required. Setting the correct answer to the data is also referred to as annotation. In order to improve the accuracy of the automatic analysis, it is desirable that there are many pieces of image data in which the correct answer is set. However, it is often difficult to determine the content of a satellite image, particularly image data generated by a synthetic aperture radar. Therefore, a lot of complicated work is required to prepare the image data in which the correct answer is set. In view of such a background, it is desirable to have a system that makes the work of setting the correct answer to image data efficient.

The transfer reading system of PTL 1 is a system that determines whether an object is lost by image processing. The transfer reading system of PTL 1 generates correct answer data indicating that there is no house in an image based on a comparison result between two pieces of image data captured at different times.

CITATION LIST

Patent Literature

PTL 1: JP 2020-30730 A

SUMMARY OF INVENTION

Technical Problem

However, in PTL 1, in a case where the object to be annotated is an object that is difficult to determine, accuracy of setting the correct answer may be deteriorated.

In order to solve the above problems, an object of the present invention is to provide an image processing device and the like capable of improving accuracy while efficiently performing annotation.

Solution to Problem

In order to solve the above problem, an image processing device of the present invention includes a region setting means that sets, as a candidate region, a region in which an object to be annotated is likely to be present in an annotation target image, a standard image extraction means that extracts a standard image that is an image in which an object identical to the object to be annotated is imaged from an annotated image, a data generation means that generates, as annotation data, data in which the annotation target image, a reference image captured when a region including the candidate region is different from the annotation target image, and the standard image are associated with each other, and an output means that outputs the annotation data generated by the data generation means.

An image processing method of the present invention includes setting, as a candidate region, a region in which an object to be annotated is likely to be present in an annotation target image, extracting a standard image that is an image in which an object identical to the object to be annotated is imaged from an annotated image, generating, as annotation data, data in which the annotation target image, a reference image captured when a region including the candidate region is different from the annotation target image, and the standard image are associated with each other, and outputting the generated annotation data.

A recording medium of the present invention records an image processing program for causing a computer to execute the steps of setting, as a candidate region, a region in which an object to be annotated is likely to be present in an annotation target image, extracting a standard image that is an image in which an object identical to the object to be annotated is imaged from an annotated image, generating, as annotation data, data in which the annotation target image, a reference image captured when a region including the candidate region is different from the annotation target image, and the standard image are associated with each other, and outputting the generated annotation data.

Advantageous Effects of Invention

According to the present invention, it is possible to improve accuracy while efficiently performing annotation.

EXAMPLE EMBODIMENT

First Example Embodiment

Figure 1:
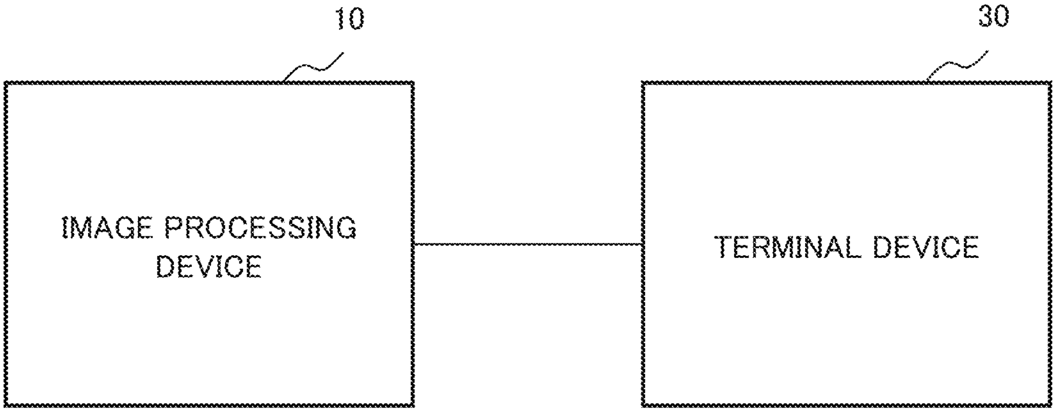
FIG. 1 is a diagram illustrating an outline of a configuration according to the first example embodiment of the present invention.

The first example embodiment of the present invention will be described in detail with reference to the drawings. FIG. 1 is a diagram illustrating an outline of a configuration of an image processing system of the present embodiment. The image processing system includes an image processing device 10 and a terminal device 30. The image processing device 10 and the terminal device 30 are connected via a network.

The image processing system of the present embodiment is a system that performs processing related to annotation on an image. The processing related to the annotation refers to, for example, outputting an annotation target image and associating information for identifying an object present in the image and information about a region where the object is present with the image based on an input result by an operation of an operator. The information associated with the image may be either information for identifying an object present in the image or a region where the object is present. In the processing related to the annotation, the information associated with the image is not limited thereto. The image processing system performs a process related to the annotation on the image acquired using, for example, a synthetic aperture radar (SAR). Data generated using the image processing system can be used as teacher data in machine training, for example.

Figure 2:
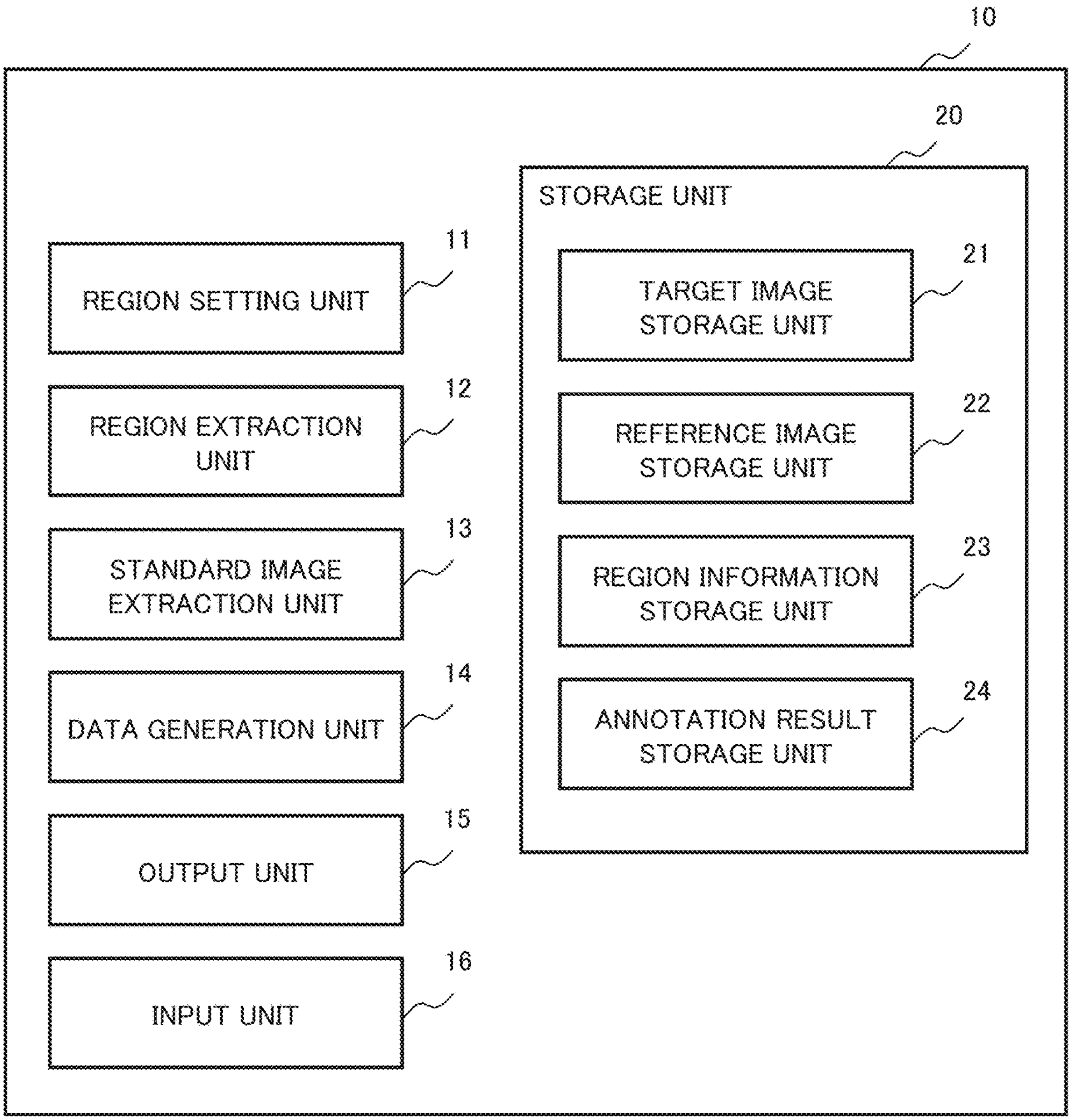
FIG. 2 is a diagram illustrating an example of a configuration of an image processing device according to the first example embodiment of the present invention.

A configuration of the image processing device 10 will be described. FIG. 2 is a diagram illustrating an example of a configuration of the image processing device 10. The image processing device 10 includes a region setting unit 11, a region extraction unit 12, a standard image extraction unit 13, a data generation unit 14, an output unit 15, an input unit 16, and a storage unit 20.

The storage unit 20 includes a target image storage unit 21, a reference image storage unit 22, a region information storage unit 23, and an annotation result storage unit 24.

The region setting unit 11 sets, as a candidate region, a region in which the object to be annotated may be present in an annotation target image. In the following description, the annotation target image, that is, the image to be subjected to the processing related to the annotation is also referred to as a target image.

The region setting unit 11 sets, as a candidate region, a region where an object to be annotated may be present in the target image. The region setting unit 11 reads, for example, a target image to be processed from the target image storage unit 21. The region setting unit 11 stores the range of the candidate region on the target image in the region information storage unit 23. The region setting unit 11 represents the range of the candidate region on the target image by, for example, coordinates in the target image and stores the range in the region information storage unit 23. For example, information about an imaged location and date and time is added to the target image.

Figure 3:
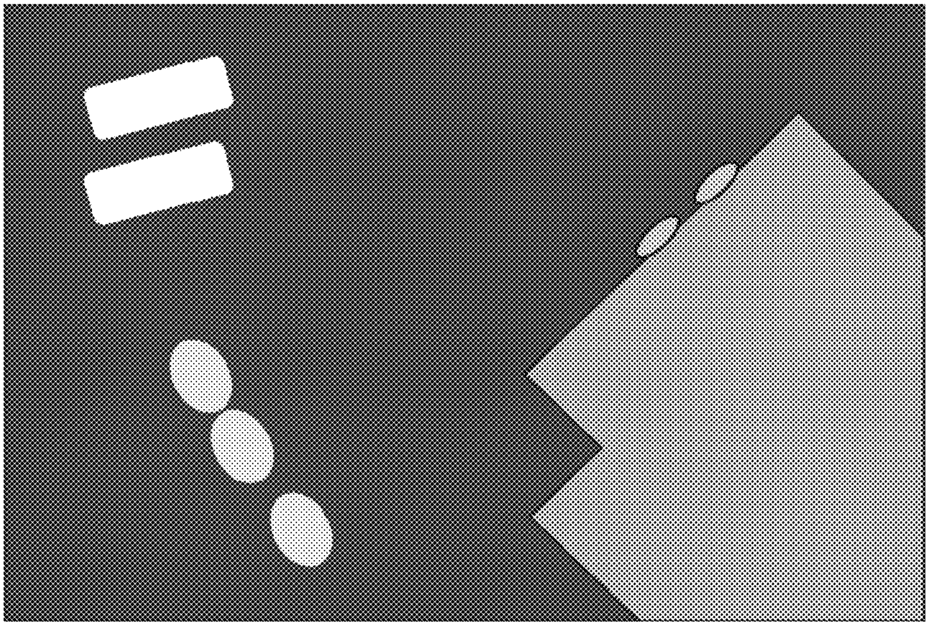
FIG. 3 is a diagram illustrating an example of a target image according to the first example embodiment of the present invention.

FIG. 3 is a diagram illustrating an example of a target image. FIG. 3 is an example of image data captured by the synthetic aperture radar. The elliptical and rectangular regions in FIG. 3 indicate, for example, regions where the reflected wave is different from the surroundings, that is, regions where an object may be present. In FIG. 3, the surroundings of the elliptical and rectangular regions are related to, for example, the sea. The gray region on the right side of FIG. 3 is related to, for example, the land.

Figure 4:
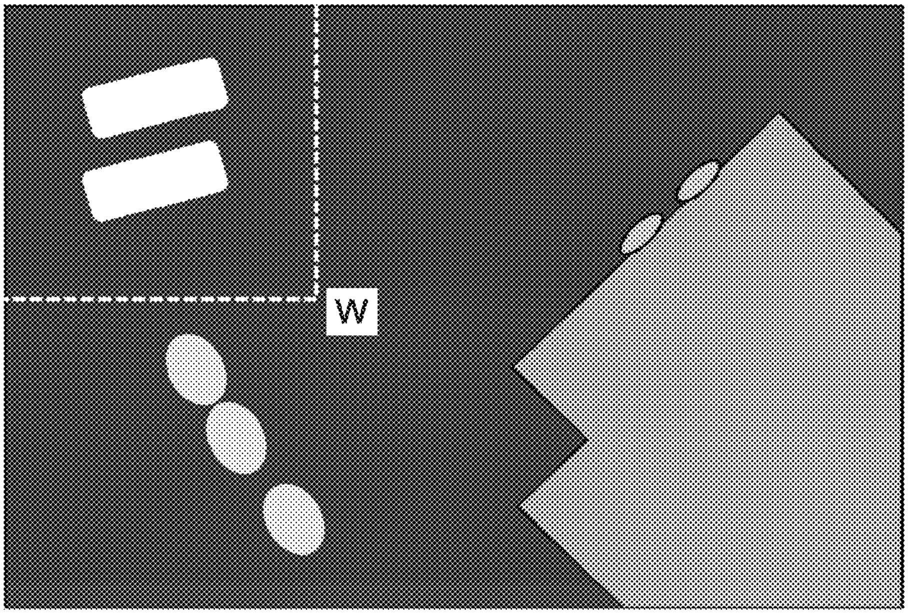
FIG. 4 is a diagram illustrating a setting example of a candidate region in the first example embodiment of the present invention.

The region setting unit 11 sets, for example, a region in which the state of the reflected wave is different from that of the surroundings as a candidate region in which the object to be annotated may be present. For example, the region setting unit 11 identifies a region having luminance different from that of the surroundings in the target image, and sets a rectangular region including the identified region as a candidate region. FIG. 4 illustrates an example in which a candidate region is set as a candidate region W on the target image. In the example of FIG. 4, the region setting unit 11 sets a rectangular region having luminance different from that of the surroundings as a candidate region where the object to be annotated may be present. In the example of FIG. 4, the candidate region W is set to a region surrounded by a dotted line from the upper right corner of the target image.

The region setting unit 11 identifies all locations where the objects to be annotated may be present in one target image, and sets the identified locations as candidate regions. For example, the region setting unit 11 sets a plurality of candidate regions by sliding the candidate region in the target image. For example, the region setting unit 11 sets a plurality of candidate regions in such a way as to cover the entire region of the candidate region existing in the target image.

Figure 5:
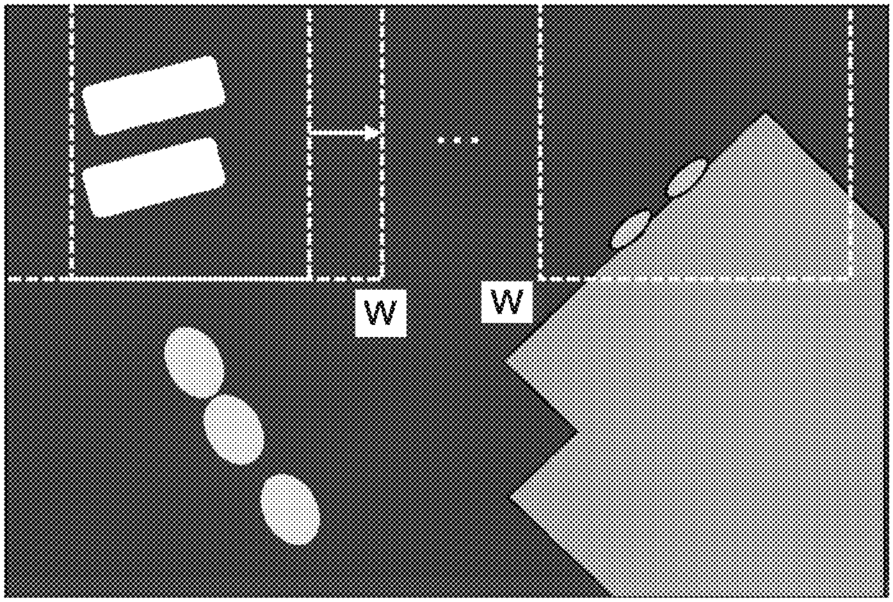
FIG. 5 is a diagram illustrating a setting example of a candidate region in the first example embodiment of the present invention.
Figure 6:
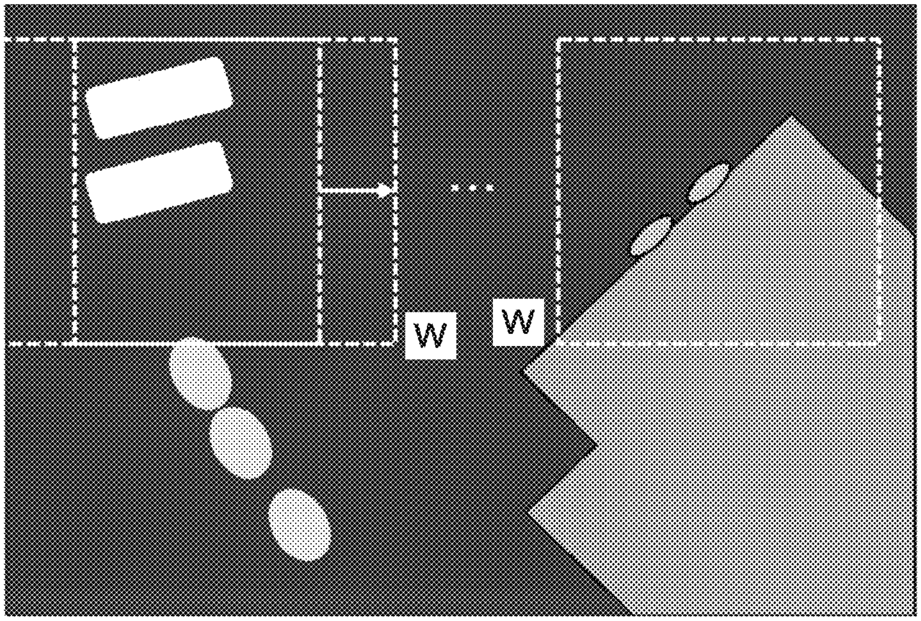
FIG. 6 is a diagram illustrating an example of setting candidate regions according to the first example embodiment of the present invention.

FIGS. 5 and 6 are diagrams illustrating an example of an operation of setting a plurality of candidate regions. For example, as illustrated in FIG. 5, the region setting unit 11 sequentially slides the candidate region W set in the upper left corner region of the target image in the right direction to set a plurality of candidate regions W. As illustrated in FIG. 6, the region setting unit 11 may further set a plurality of candidate regions W by sliding the candidate region W downward from the initial position in FIG. 5 and then sequentially sliding the candidate region W rightward. At this time, the respective candidate regions may or may not overlap each other. The method of sliding the candidate region when setting the plurality of candidate regions is not limited to the above example. For example, when the candidate region is slid, the region setting unit 11 stores information indicating the range of the candidate region in the region information storage unit 23 in a case where there is a region in which the change in luminance satisfies the criterion in the candidate region.

The region setting unit 11 may compare the position where the target image is acquired with the map information, and set a candidate region in a region set in advance for the target image. For example, when the object to be annotated is a ship, the candidate region may be set in a region where the ship may be present, such as the sea, the river, and the lake. In such a case, the region setting unit 11 sets the candidate regions only in the regions of the sea, the river, and the lake with reference to the map information, for example.

The region extraction unit 12 extracts an image of a region related to the candidate region from the reference image as a related image. The region extraction unit 12 extracts an image of a region related to the candidate region from the target image as a candidate image. The reference image is an image used as a comparison target for determining whether an object to be annotated exists in the target image. The reference image is an image acquired at a time different from that of the target image in the region including the region of the target image. The number of reference images related to one target image may be plural.

The reference image is, for example, an image captured when a region including a region where the target image is captured is imaged at the time different from the time when the target image is imaged in the same method as the target image. For example, among images captured at the same time every day at the identical location, one image is set as the target image, and an image captured on another day is used as the reference image. The image capturing cycle and the image capturing time may not be constant. For example, information about an imaged location and date and time is added to the reference image. The region extraction unit 12 reads, for example, the reference image from the reference image storage unit 22.

Based on the information of the candidate region stored in the region information storage unit 23, the region extraction unit 12 identifies a region related to the candidate region on the reference image. The region extraction unit 12 extracts an image of a region related to the candidate region from the reference image as a related image.

The region extraction unit 12 may set the target image including the candidate region as the candidate image without extracting the candidate image from the target image. The region extraction unit 12 may refer to the position information added to the image without extracting the target image from the reference image, and may set the reference image including the candidate region as the related image related to the candidate region.

Figure 7:
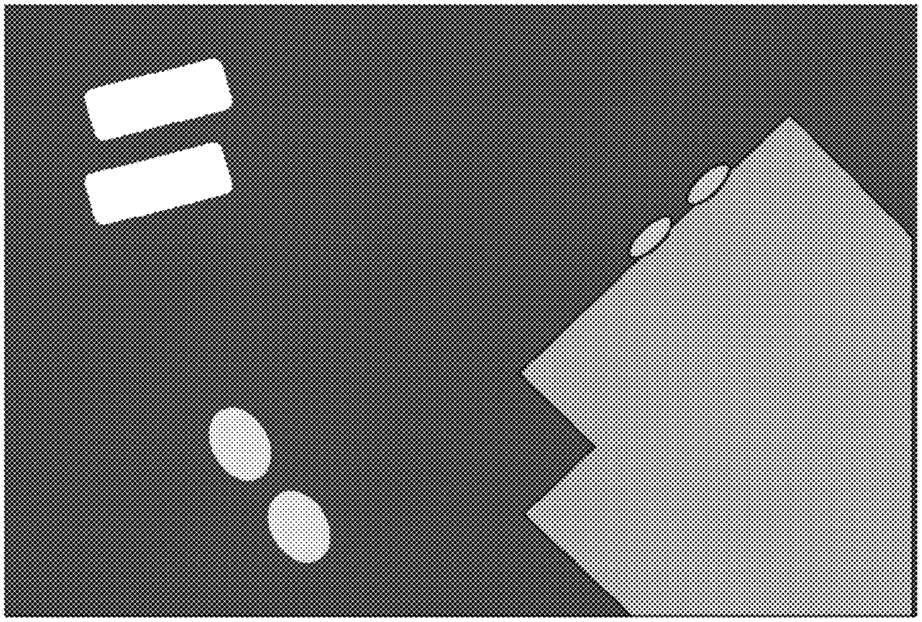
FIG. 7 is a diagram illustrating an example of a reference image according to the first example embodiment of the present invention.
Figure 8:
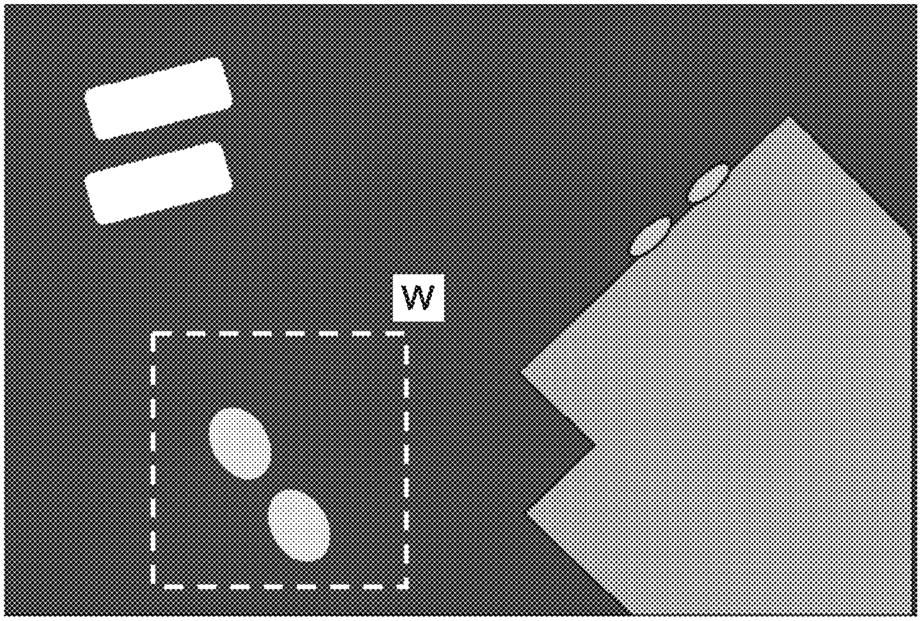
FIG. 8 is a diagram illustrating an example of a reference image according to the first example embodiment of the present invention.

FIG. 7 is a diagram illustrating an example of a reference image. FIG. 7 illustrates an example in which the number of elliptical objects is different from that of the target image illustrated in FIG. 3 since the reference image is an image acquired at a time different from that of the target image. FIG. 8 is a diagram illustrating an example of the candidate region W related to a candidate region on the target image. The example of FIG. 8 illustrates a case where the region extraction unit 12 identifies the candidate region W set in the vicinity of the elliptical object on the reference image and extracts the image in the candidate region as the related image.

For example, the region extraction unit 12 extracts an image of a region related to the candidate region from the two reference images. The two reference images are images captured at the time different from that of the target image. For example, the region extraction unit 12 extracts a related image G2 and a related image G3 for a candidate image G1 with respect to the image in the candidate region of the target image. For example, the region extraction unit 12 extracts the related image G2 from a reference image A acquired one day before the day on which the target image is acquired by the synthetic aperture radar, and extracts the related image G3 from a reference image B acquired two days before. The region extraction unit 12 associates the candidate image G1, the related image G2, and the related image G3. The number of related images associated with one candidate image may not be two, and is set according to the number of reference images. The number of reference images can be appropriately set.

The standard image extraction unit 13 extracts, from an annotated image, a standard image that is an image in which an object identical to the object to be annotated is imaged. The standard image extraction unit 13 searches the annotated image data stored in the annotation result storage unit 24 as the annotation completion data to extract an image in which the object identical to the object to be annotated is imaged as the standard image. The identical objects include similar objects. As the standard image, for example, an image whose result is determined to be correct in verification of the result of the annotation among the annotated images is used. For example, in a case where the target image is captured by the synthetic aperture radar, the verification of the result of the annotation is made using the optical image.

An image in which the determination result at the time of performing the annotation is incorrect may be associated with the annotated image. The image in which the determination result at the time of performing the annotation is incorrect is, for example, an image identified that the type of the object determined in the annotation is incorrect when the image that is annotated is determined using the image captured by another method. For example, it is assumed that, when an object on an image acquired using a synthetic aperture radar is annotated, an annotation operator determines an object present in a candidate region as a ship. In the subsequent verification of the result of the annotation, for example, in a case where the operator of the annotation or another operator identifies the object existing in the candidate region as the tank, the determination result at the time of the annotation is determined to be incorrect. The verification of the result of the annotation is made, for example, by an operator identifying an object present in the candidate region using an optical image obtained by imaging the location identical to that of the target image.

When an incorrect image is associated with the annotation completion data, the standard image extraction unit 13 extracts, as the standard image, an annotated image and an incorrect image associated with the annotated image. In such a case, the standard image extraction unit 13 sets, for example, an annotated image as a correct image and extracts a set of a correct image and an incorrect image as a standard image.

The standard image extraction unit 13 compares the similarity between the candidate image and the annotated image, and determines that the candidate image and the annotated image are similar when the similarity is equal to or more than the criterion.

The standard image extraction unit 13 determines whether the object of the candidate image and the object of the annotated image are identical based on, for example, similarity of map coordinates and similarity of image feature amounts. The standard image extraction unit 13 may determine whether the object of the candidate image and the object of the annotated image are identical based on items other than the above.

For example, the standard image extraction unit 13 determines whether the imaged object is identical to the candidate image for the annotated image for which the imaging position is determined to be identical. The standard image extraction unit 13 determines whether the imaging positions of the candidate image and the annotated image are identical, for example, based on the distance between the center coordinates of the candidate image and the center coordinates of the annotated image. When the distance between the center coordinates of the candidate image and the center coordinates of the annotated image is equal to or less than the reference, the standard image extraction unit 13 determines that the imaging positions are identical.

When determining whether the object of the candidate image and the object of the annotated image are identical based on the similarity of the image feature amounts, the standard image extraction unit 13 calculates the similarity of the image feature amounts between the images using, for example, feature point matching. In the feature point matching, for example, the standard image extraction unit 13 extracts feature points from the candidate image and the annotated image, and determines that the two images are images obtained by imaging the identical object when the similarity of the feature points satisfies the criterion. A method for determining similarity of image feature amounts using feature point matching is disclosed, for example, in P. F. Alcantarilla, J. Nuevo and A. Bartoli, "Fast Explicit Diffusion for Accelerated Features in Nonlinear Scale Spaces", Proceedings British Machine Vision Conference 2013, pp. 13.1-13.11. The standard image extraction unit 13 may calculate the similarity of the image feature amounts using a method other than the feature point matching method, and the standard image extraction unit 13 may calculate the similarity of the image feature amounts using, for example, histogram comparison or template matching of luminance.

When the image in which the location identical to the candidate region is imaged is not stored in the annotation result storage unit 24, the standard image extraction unit 13 compares each image of the annotation completion data stored in the annotation result storage unit 24 with the annotation target image to extract the standard image. For example, in a case where there is no image having the identical imaging position, the standard image extraction unit 13 extracts, as the standard image, an image that satisfies the criterion of similarity of the image feature amounts among all the annotated images stored in the annotation result storage unit 24.

The standard image extraction unit 13 may determine whether the object of the candidate image and the object of the annotated image are identical by further using the similarity of the sizes of the objects existing in the image. In such a case, for example, the relationship between the number of pixels and the actual distance is set in advance for each of the two images. For example, the standard image extraction unit 13 determines the similarity of the sizes of the objects on the two images based on the ratio or difference of the areas of the objects present in the respective images. In a case where the criterion of the similarity in size is set based on, for example, the ratio of the areas of the objects respectively present in the two images, the standard image extraction unit 13 determines that the sizes of the objects in the two images are identical when the ratio of the areas is within the reference range. In a case where the criterion of the similarity in size is set based on, for example, a difference in area between objects present on the two images, the standard image extraction unit 13 determines that the sizes of the objects on the two images are identical when the difference in area is within the reference.

The data generation unit 14 generates, as annotation data, data in which the annotation target image, the reference image, and the standard image are associated with each other. The reference image is an image captured at the time different from that of the annotation target image with respect to the region including the candidate region. For example, the data generation unit 14 generates annotation data in which the annotation target image, that is, the candidate image obtained by extracting the candidate region from the target image, the related image obtained by extracting the candidate image from the standard image, and the reference image are associated with each other. The data generation unit 14 may generate, as annotation data, the candidate image, the related image, and an image obtained by enlarging the vicinity of the candidate image in the standard image in association with each other. The data generation unit 14 outputs the generated annotation data to the terminal device 30 via the output unit 15, for example.

The data generation unit 14 may generate display data for displaying the candidate image, the related image, and the standard image in a comparable manner as annotation data. The display data for display in a comparable manner refers to, for example, display data in a state in which an operator can compare two images by disposing images to be compared in a lateral direction. The data generation unit 14 may output the generated display data to a display device (not illustrated) connected to the image processing device 10.

In a case where an incorrect image is associated with the standard image extracted by the standard image extraction unit 13, the data generation unit 14 may generate annotation data by using the standard image as a set of a correct image and an incorrect image.

Figure 9:
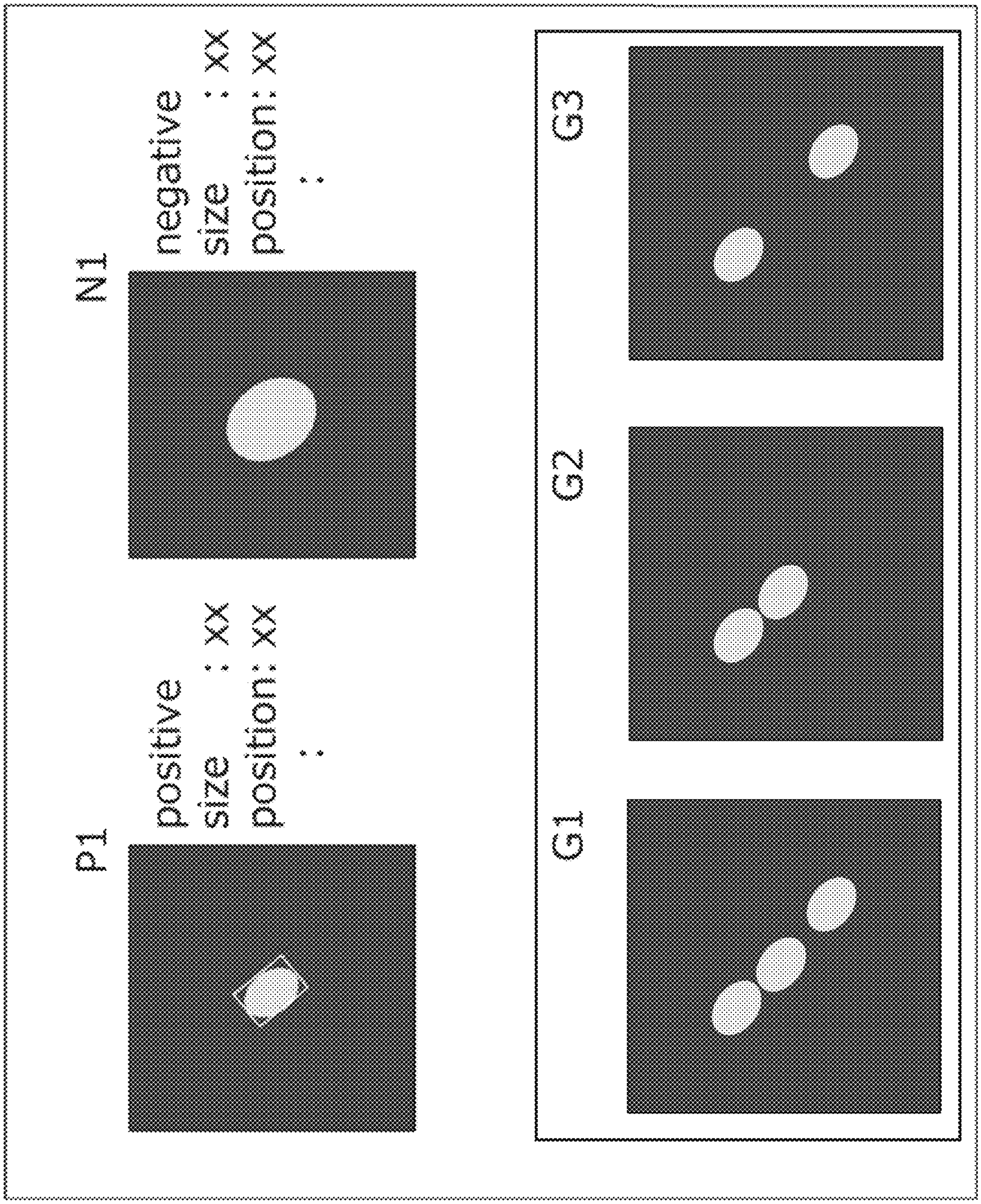
FIG. 9 is a diagram illustrating an example of output data according to the first example embodiment of the present invention.

FIG. 9 illustrates an example of a display screen on which the candidate image output as the annotation data, the related image, and the standard image are displayed in a comparable manner. In the example of FIG. 9, the standard image is displayed as a set of a correct image and an incorrect image. An image P1 in FIG. 9 is a correct image of the standard image. An image N1 in FIG. 9 is an incorrect image of the standard image. In the example of FIG. 9, information about the size of the object to be annotated and the position where the image is captured is added to the images P1 and N1. The items of information added to the standard image are not limited thereto.

The image G1 in FIG. 9 is a candidate image, that is, an image related to a candidate region on the target image. The images G2 and G3 in FIG. 9 are related images, that is, images related to candidate regions on the reference image. The images G2 and G3 are images on the reference image captured at different times.

The data generation unit 14 generates annotation completion data based on the information about the annotation. The information about the annotation is input to the terminal device 30 as annotation information by the operation of the operator. The annotation information is, for example, information for identifying the annotation target image, that is, the type of the object to be annotated on the target image, and information for identifying the region where the object exists in the image. For example, the data generation unit 14 acquires information identifying a region where an object exists in the annotation information as a rectangular region surrounding the object on the candidate image. For example, the data generation unit 14 generates, as the annotation completion data, data in which the type of the object on the candidate image and the information about the region where the object exists are associated with the candidate image based on the annotation information. The region indicated by the annotation information is also referred to as an annotation region. The data generation unit 14 stores the generated annotation completion data in the annotation result storage unit 24. The setting of the annotation region is not limited to a method of surrounding the region with a rectangular line. For example, the annotation region may be set by filling the annotation region.

Figure 10:
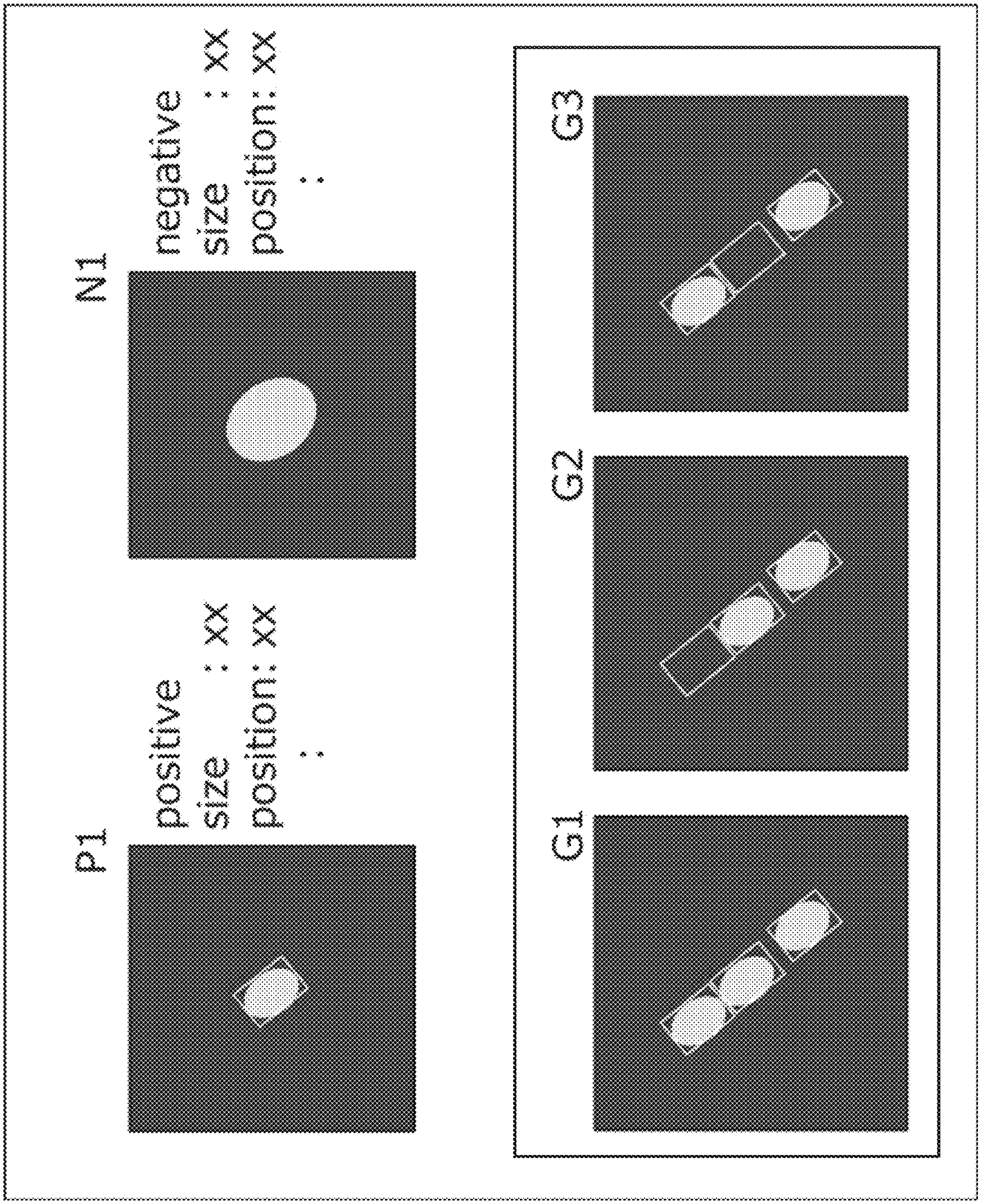
FIG. 10 is a diagram illustrating an example of output data according to the first example embodiment of the present invention.

FIG. 10 illustrates an example of the display screen in a case where the annotation region is set on the display screen of FIG. 9. In FIG. 10, in the candidate image G1, a rectangular line is set as a line indicating the annotation region around the elliptical object. In FIG. 10, rectangular lines are also displayed at related positions for G2 and G3 which are the related images.

Figure 11:
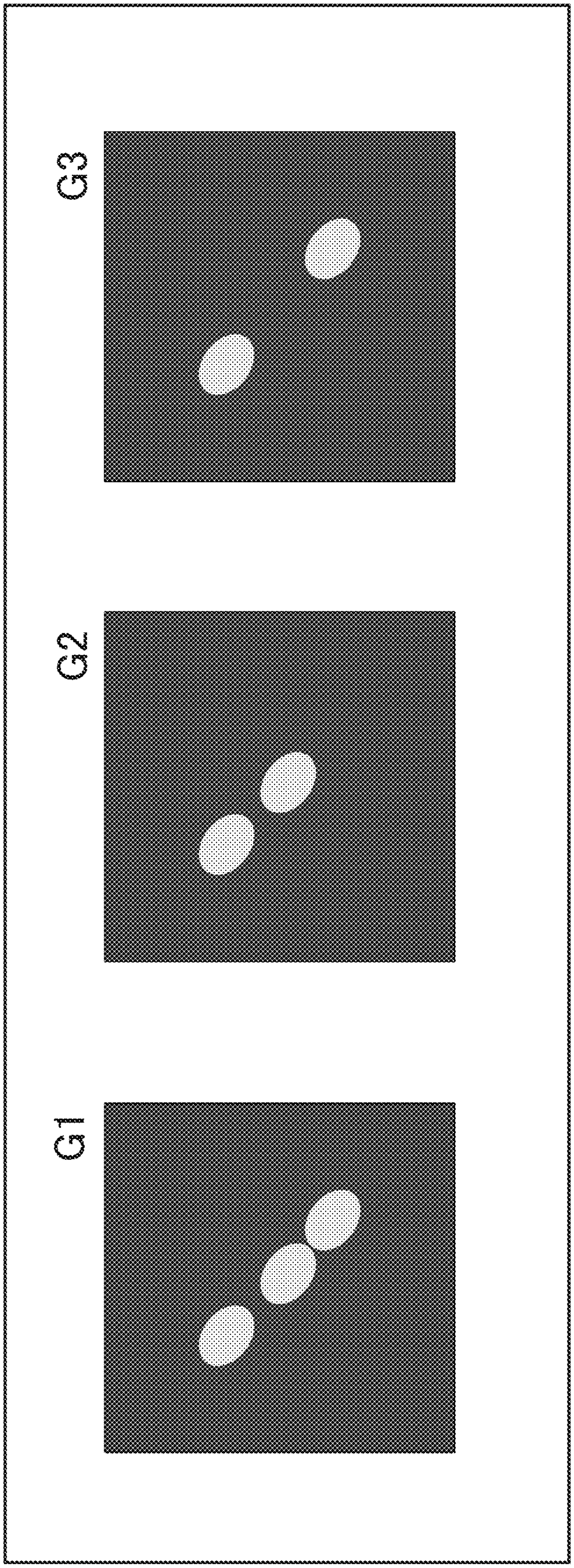
FIG. 11 is a diagram illustrating an example of output data according to the first example embodiment of the present invention.
Figure 12:
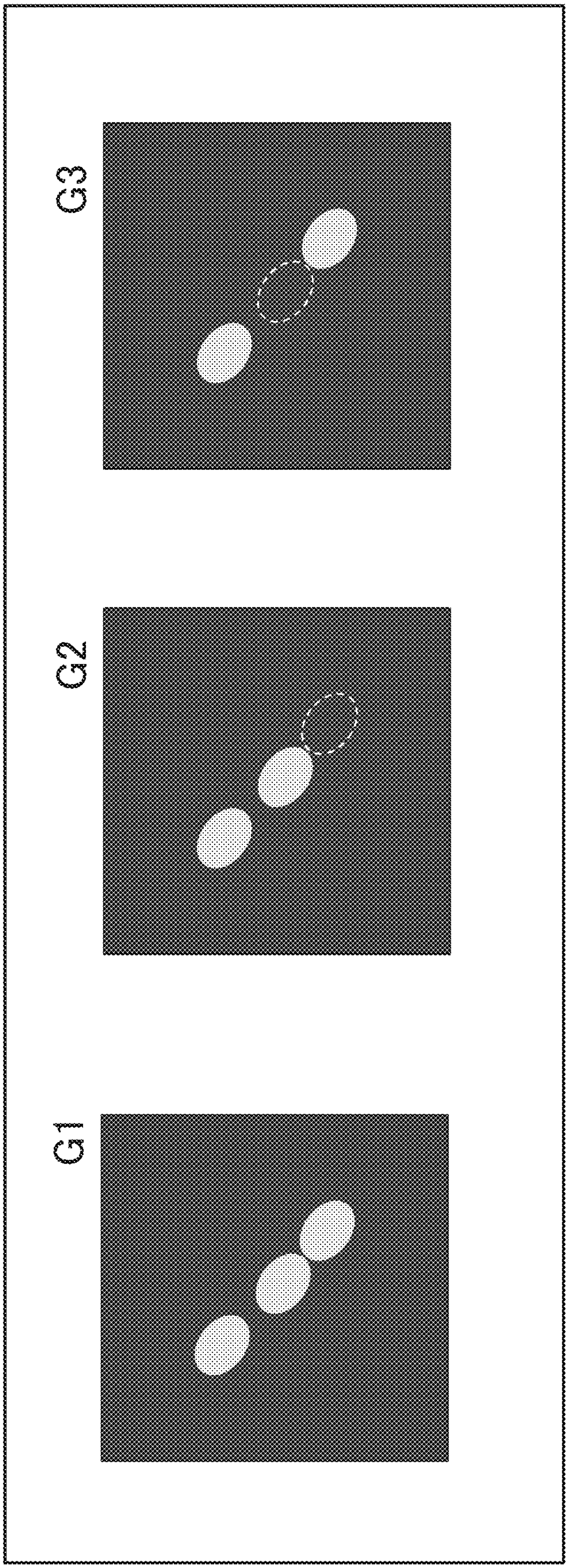
FIG. 12 is a diagram illustrating an example of output data according to the first example embodiment of the present invention.

FIG. 11 is a diagram illustrating only a lower portion of the display screen of FIG. 9. FIG. 11 is a diagram illustrating an example of a display screen on which the candidate image G1, the related image G2, and the related image G3 are displayed in a comparable manner. In FIG. 12, a region where an object exists in the candidate image G1 but no object exists in the related image G2 and the related image G3 is indicated by a dotted line in the image of FIG. 11. In this way, by displaying the candidate image G1, the related image G2 and the related image G3 which are captured at different times in a comparable manner, the operator can more clearly recognize the region where the movable object exists.

Figure 13:
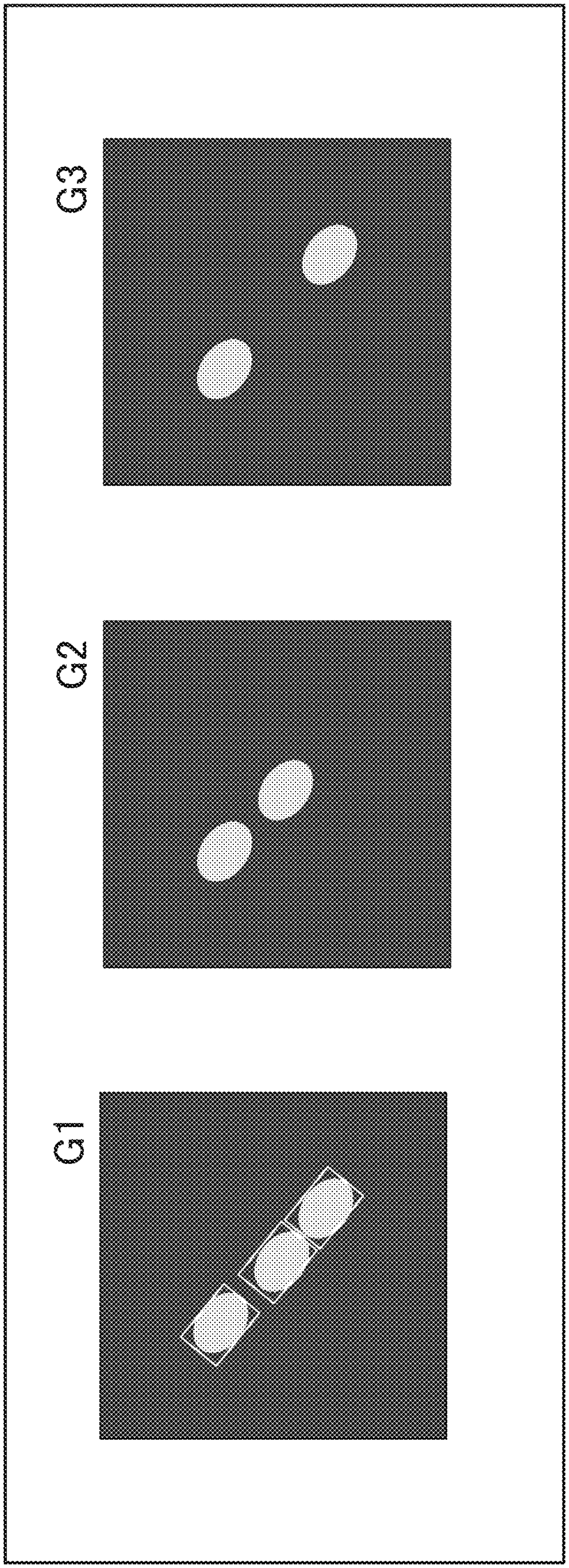
FIG. 13 is a diagram illustrating an example of output data according to the first example embodiment of the present invention.
Figure 14:
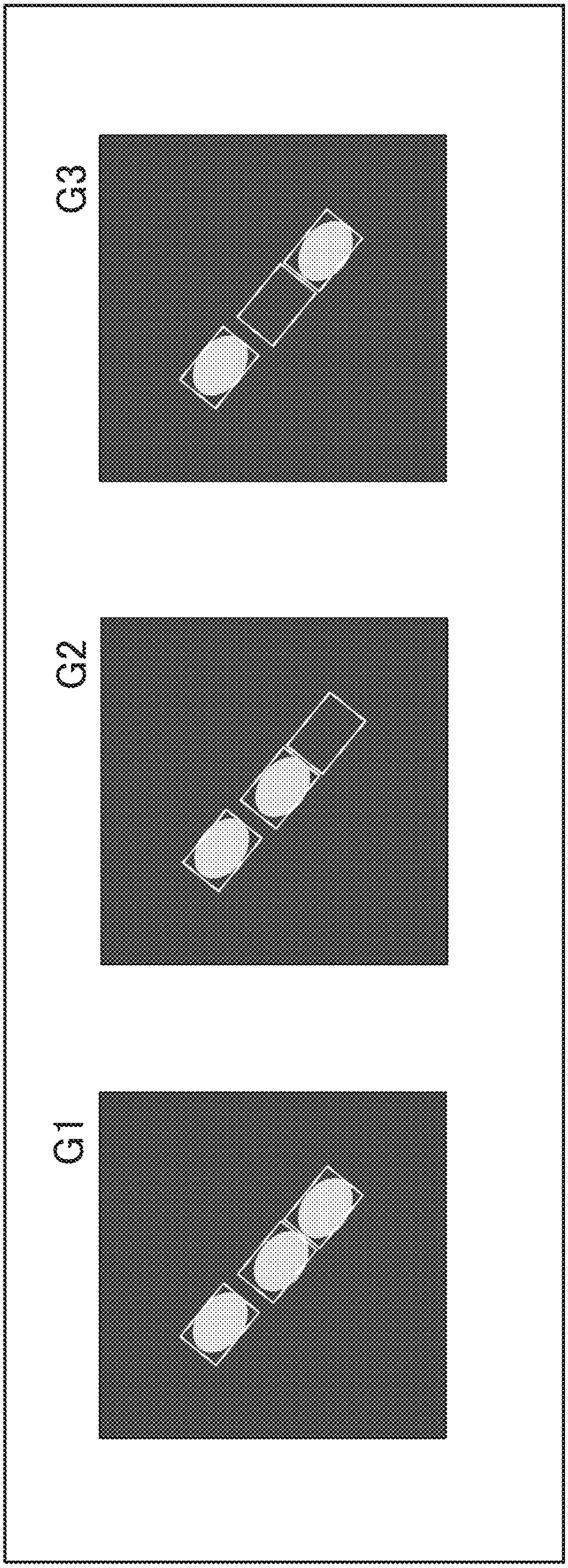
FIG. 14 is a diagram illustrating an example of output data according to the first example embodiment of the present invention.

FIG. 13 illustrates an example in which the annotation region is set on the candidate image G1 by the operator's operation while the screen of FIG. 11 is displayed. In FIG. 13, a region surrounded by a rectangular line on the candidate image G1 is set as the annotation region. FIG. 14 illustrates an example of a display screen in which the annotation region is added to the candidate image G1 and is further displayed on the related image G2 and the related image G3. As described above, by displaying the annotation region not only in the candidate image G1 but also in the related image G2 and the related image G3 that are imaged at different times, the operator can process the annotation while more clearly recognizing the region where the movable object exists.

The output unit 15 outputs the annotation data generated by the data generation unit 14 to the terminal device 30. The output unit 15 may output the display data generated based on the annotation data to a display device (not illustrated) connected to the image processing device 10.

The input unit 16 receives an input of information related to the annotation of the object to be annotated as annotation information with respect to the annotation target image. The input unit 16 acquires the annotation information input to the terminal device 30 by the operation of the operator from the terminal device 30.

For example, the input unit 16 acquires, as the annotation information, information about the range of the annotation region and information identifying the type of the object on the image. The input unit 16 may acquire, as the annotation information, either the information about the range of the annotation region or the information identifying the type of the object on the image. The input unit 16 may acquire information about items other than the above items as annotation information. The input unit 16 may acquire the annotation information from an input device (not illustrated) connected to the image processing device 10.

The target image storage unit 21 of the storage unit 20 stores the image data of the annotation target image as the target image. The target image storage unit 21 stores, for example, the imaging date and time and the imaging position information in association with the target image. The reference image storage unit 22 stores the image data of the reference image. The reference image storage unit 22 stores, for example, the reference image in association with the imaging date and time and the imaging position information. The reference image storage unit 22 may store the reference image in association with information about the target image related to the reference image. The target image and the information associated with the reference image are not limited to these examples. The region information storage unit 23 stores information about the range of the candidate region set by the region setting unit 11. The annotation result storage unit 24 stores, as annotation completion data, the annotation target image and the annotation information in association with each other. The annotation result storage unit 24 may store the information about the image imaging position in association with the image included in the annotation completion data. The annotation result storage unit 24 may store an incorrect image in association with the image included in the annotation completion data.

Each piece of the above-described data related to the annotation stored in the storage unit 20 is input to the image processing device 10 by, for example, an operator. Each piece of data related to the annotation stored in the storage unit 20 may be acquired from the terminal device 30 or a server connected via a network.

The storage unit 20 is includes, for example, a hard disk drive. The storage unit 20 may include, for example, another storage device such as a nonvolatile semiconductor storage device. The storage unit 20 may be configured by combining a plurality of types of storage devices such as a nonvolatile semiconductor storage device and a hard disk drive. Part or all of the storage unit 20 may be included in an external device connected to the image processing device 10 via a network.

The terminal device 30 is a terminal device for operation by an operator, and includes an input device and a display device (not illustrated). The terminal device 30 acquires annotation data from the image processing device 10. The terminal device 30 outputs a display screen on which the annotation work is performed to a display device (not illustrated) based on the annotation data. For example, the terminal device 30 displays a display screen in which the candidate image, the related image, and the standard image are associated with each other on the display device. The terminal device 30 may display both the correct image and the incorrect image for the standard image.

The terminal device 30 receives annotation information input by an operation of an operator. The terminal device 30 outputs the acquired annotation information to the image processing device 10. The number of terminal devices 30 may be plural. The number of terminal devices can be appropriately set.

Figure 15:
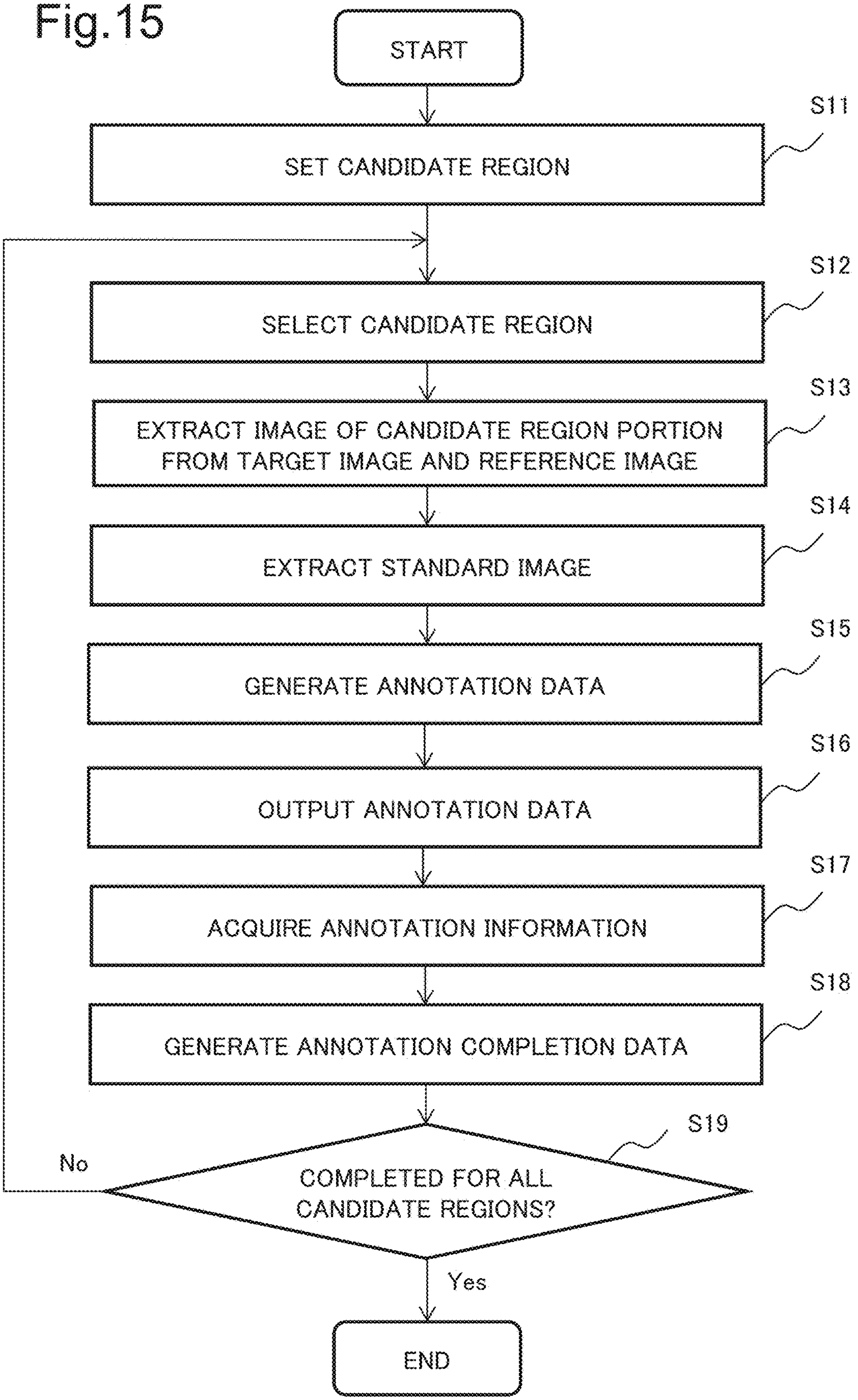
FIG. 15 is a diagram illustrating an example of an operation flow of the image processing device according to the first example embodiment of the present invention.

An operation of the image processing system of the present embodiment will be described. FIG. 15 is a diagram illustrating an example of an operation flow of the image processing device 10 according to the present embodiment.

The region setting unit 11 of the image processing device 10 reads the target image that is the annotation target image from the target image storage unit 21 of the storage unit 20.

When the target image is read, the region setting unit 11 sets a region in which the object to be annotated may be present in the target image as a candidate region (step S11). For example, the region setting unit 11 identifies a region where an object may be present based on the luminance value of each pixel in the image. When the region where the object may be present is identified, a rectangular region including the identified region is set as a candidate region. The region setting unit 11 sets, for example, a region smaller than the entire target image as a candidate region.

When the candidate region is set, the region setting unit 11 stores information about the set candidate region in the region information storage unit 23. The region setting unit 11 stores, for example, coordinates for identifying the outer peripheral portion of the candidate region on the target image in the region information storage unit 23 as information about the candidate region.

The region setting unit 11 sets a plurality of candidate regions in such a way as to cover the entire region of the candidate region existing in the target image. The region setting unit 11 slides the candidate region in the target image, for example, and sets a region where an object may be present as the candidate region.

When the candidate region is set, the region extraction unit 12 selects a candidate region to be annotated from the candidate regions stored in the region information storage unit 23 (step S12). For example, the region extraction unit 12 selects, as a candidate region to be annotated, a candidate region that has been stored earliest as a candidate region among candidate regions for which the annotation has not been completed. The method of selecting the candidate region may be another method.

When the candidate region is selected, the region extraction unit 12 extracts an image of a portion of the candidate region from the target image as the candidate image. The region extraction unit 12 reads the reference image related to the target image from the reference image storage unit 22 to extract an image of a portion of the candidate region from the reference image as the related image (step S13). For example, the region extraction unit 12 extracts an image of a portion in the candidate region from each of the two reference images as a related image.

When the candidate image and the related image are extracted, the standard image extraction unit 13 searches the annotation completion data stored in the annotation result storage unit 24 to extract an image in which the object identical to the candidate image exists in the image as the standard image (step S14). For example, the standard image extraction unit 13 extracts, as a standard image, an image whose similarity satisfies the criterion based on the similarity between the image stored as the annotation completion data and the candidate image.

When the standard image is extracted, the data generation unit 14 generates, as annotation data, data in which the annotation target image, the reference image captured at the time different from that of the annotation target image with respect to the region including the candidate region, and the standard image are associated with each other (step S15). For example, the data generation unit 14 generates, as annotation data, data in which the candidate image, the related image, and the standard image are associated with each other.

When the annotation data is generated, the output unit 15 outputs the generated annotation data to the terminal device 30 (step S16).

When the annotation data is acquired, the terminal device 30 outputs the display data based on the annotation data to a display device (not illustrated). When the annotation information is input by the operation of the operator while the display data is displayed based on the annotation data, the terminal device 30 outputs the input annotation information to the image processing device 10.

The input unit 16 of the image processing device 10 acquires the annotation information from the terminal device 30 (step S17). When the annotation information is acquired, the data generation unit 14 generates annotation completion data in which the data of the candidate image and the annotation information are associated with each other (step S18). The data generation unit 14 stores the generated annotation completion data in the annotation result storage unit 24.

When the annotation completion data is saved, in a case where the processing of the annotation has been completed for all the candidate regions (Yes in step S19), the image processing device 10 ends the process related to the annotation. When there is a candidate region for which the processing of the annotation has not been completed (No in step S19), the image processing device 10 executes processing from the operation of selecting the candidate region in step S12.

The annotation completion data generated by the above method can be used, for example, as teacher data when a machine training model for identifying an image is generated in the image recognition device.

The above description has been made for the example in which the annotation is made to the target image acquired by the synthetic aperture radar, but the target image may be an image acquired by a method other than the synthetic aperture radar. For example, the target image may be an image acquired by an infrared camera.

In the above description, an example in which annotation is made with reference to an image acquired by the same method as the target image is described. In addition to such a configuration, the determination result in the annotation may be verified with reference to another type of image. For example, the annotated image that is acquired by the synthetic aperture radar and the optical image captured by the optical camera that images the visible light region at the identical location may be displayed side by side to verify whether the type of the object determined in the annotation is correct. By verifying the correctness by such a method, it is also possible to generate a correct image and an incorrect image to be used as the standard image.

Figure 16:
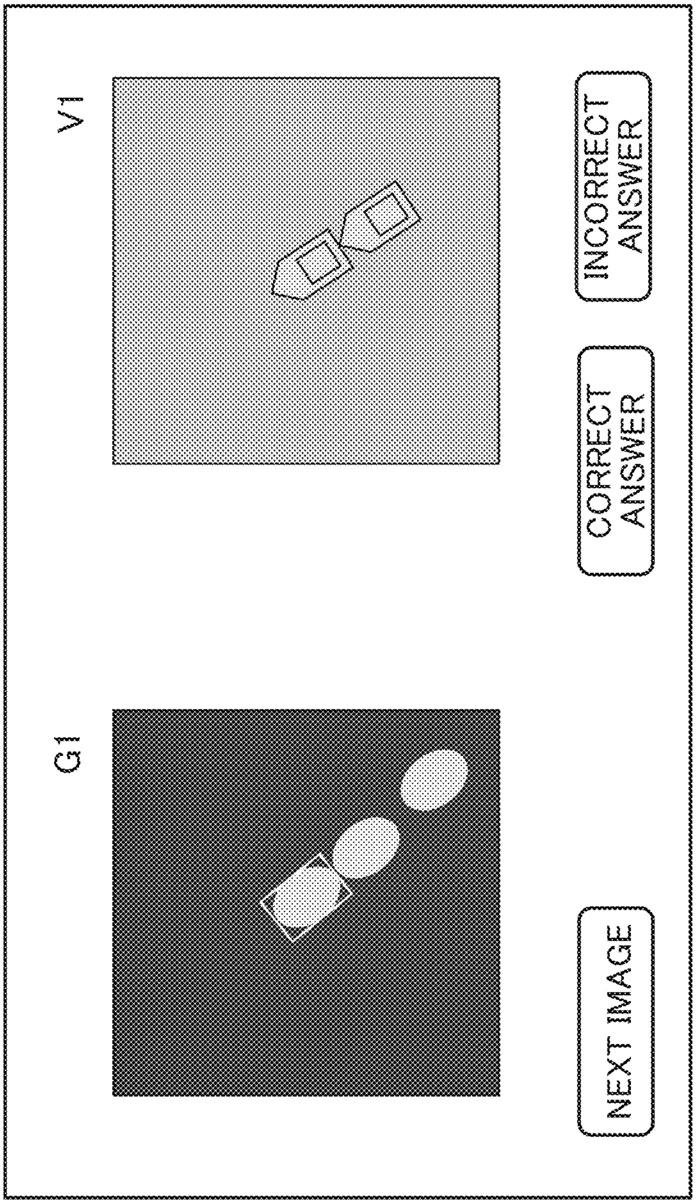
FIG. 16 is a diagram illustrating an example of a verification screen according to the first example embodiment of the present invention.

FIG. 16 is a diagram illustrating an example of a display screen when verifying the determination result in the annotation. The example of FIG. 16 illustrates an example of a display screen in which an annotated image G1 and an image V1 acquired by an imaging device different from that of the image G1 at the location identical to that of the image G1 are disposed and displayed in a comparable manner. In the example of FIG. 16, the image G1 is, for example, an image acquired using a synthetic aperture radar, and the image V1 is, for example, an image acquired using an optical camera. In the example of FIG. 16, selection buttons of "next image", "correct answer", and "incorrect answer" are set. The selection button of "next image" is a button for switching an image to be verified. The "correct answer" is a button for inputting that the determination result in the annotation is correct. The "incorrect answer" is a button for inputting that the determination result in the annotation is incorrect.

In the example of FIG. 16, for example, in a case where the "incorrect answer" button is selected, the data generation unit 14 removes the related data from the annotation completion data and stores the data as incorrect answer data.

In the example of FIG. 16, for example, in a case where the "correct answer" button is selected, the data generation unit 14 associates the correct information with the annotation completion data and updates the annotation completion data. For example, the data generation unit 14 may associate the image of the annotation completion data in which the incorrect answer is selected with another annotation completion data including the image at the identical location as the incorrect answer image.

The image processing device 10 of the image processing system according to the present embodiment outputs, as annotation data, a candidate image obtained by extracting a region where an object may be present from a target image that is an annotation target image, a related image obtained by extracting a region related to the candidate image from a reference image, and a standard image in association with each other. The image processing device 10 outputs, as annotation data, a target image that is an annotation target image, an image captured at a time different from that of the target image, and a standard image in which the annotation for the object identical to the object to be annotated is completed in association with each other. By displaying each image in such a way as to be comparable using the annotation data, for example, the operator who makes the annotation can perform the operation of the annotation by referring to the presence or absence of the change in the object to be annotated and the past annotation result, and can easily distinguish the object from the region. By displaying the reference image and the standard image at the time of making annotation, it is possible to suppress variations in determination between the identical operator and operator. As a result, by using the image processing device of the present embodiment, it is possible to improve accuracy while efficiently making annotation.

In a case where the image processing device 10 outputs an incorrect image in the past annotation result as the standard image, the operator can refer to an example of a case where the operator makes a mistake when making the annotation. Therefore, for example, the type of the object to be annotated can be more easily determined. Therefore, in a case where the image processing device 10 outputs an incorrect image in the past annotation result as the standard image, the accuracy of the annotation can be further improved.

Second Example Embodiment

Figure 17:
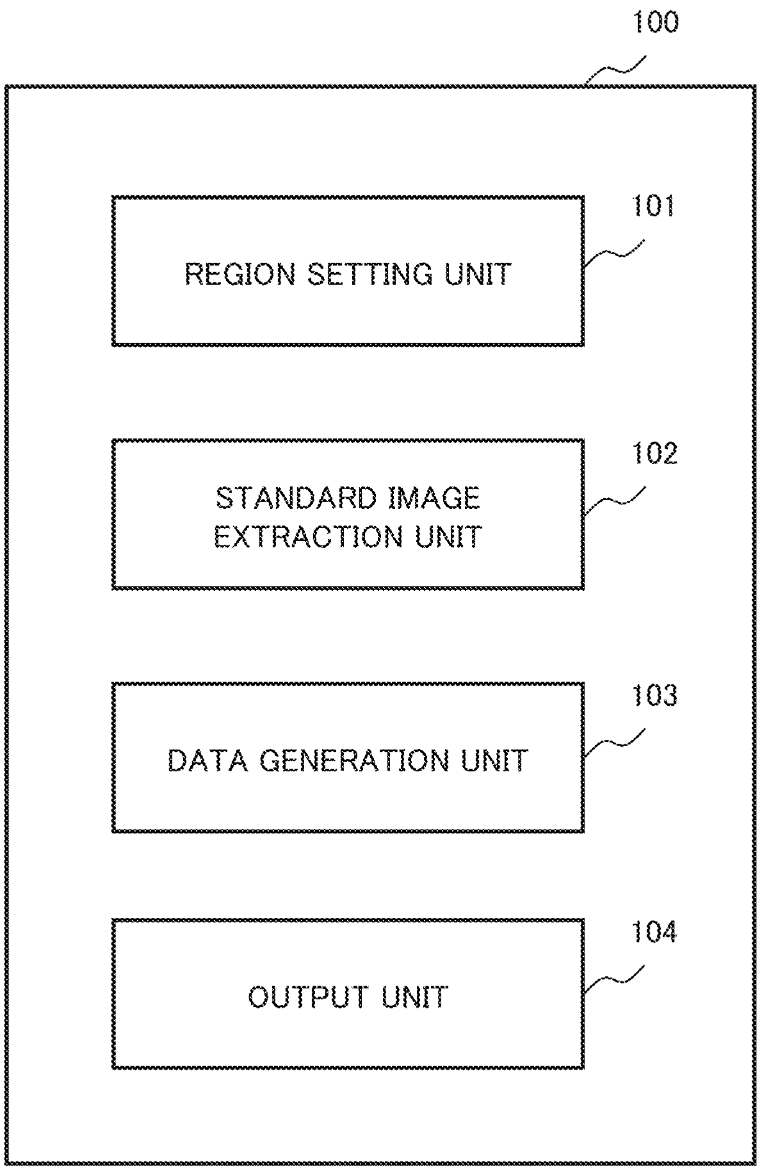
FIG. 17 is a diagram illustrating an example of a configuration of the second example embodiment of the present invention.

The second example embodiment of the present invention will be described in detail with reference to the drawings. FIG. 17 is a diagram illustrating an outline of a configuration of an image processing device 100. The image processing device 100 of the present embodiment includes a region setting unit 101, a standard image extraction unit 102, a data generation unit 103, and an output unit 104. The region setting unit 101 sets, as a candidate region, a region in which the object to be annotated may be present in the annotation target image. The standard image extraction unit 102 extracts, from an annotated image, a standard image that is an image in which an object identical to the object to be annotated is imaged. The data generation unit 103 generates, as annotation data, data in which the annotation target image, a reference image which is captured of a region including the candidate region at a time different from the time when the annotation target image is captured, and the standard image are associated with each other. The output unit 104 outputs the annotation data generated by the data generation unit 103.

The region setting unit 11 is an example of the region setting unit 101. The region setting unit 101 is an aspect of a region setting means. The standard image extraction unit 13 is an example of the standard image extraction unit 102. The standard image extraction unit 102 is an aspect of a standard image extraction means. The data generation unit 14 is an example of the data generation unit 103. The data generation unit 103 is an aspect of a data generation means. The output unit 15 is an example of the output unit 104. The output unit 104 is an aspect of an output means.

Figure 18:
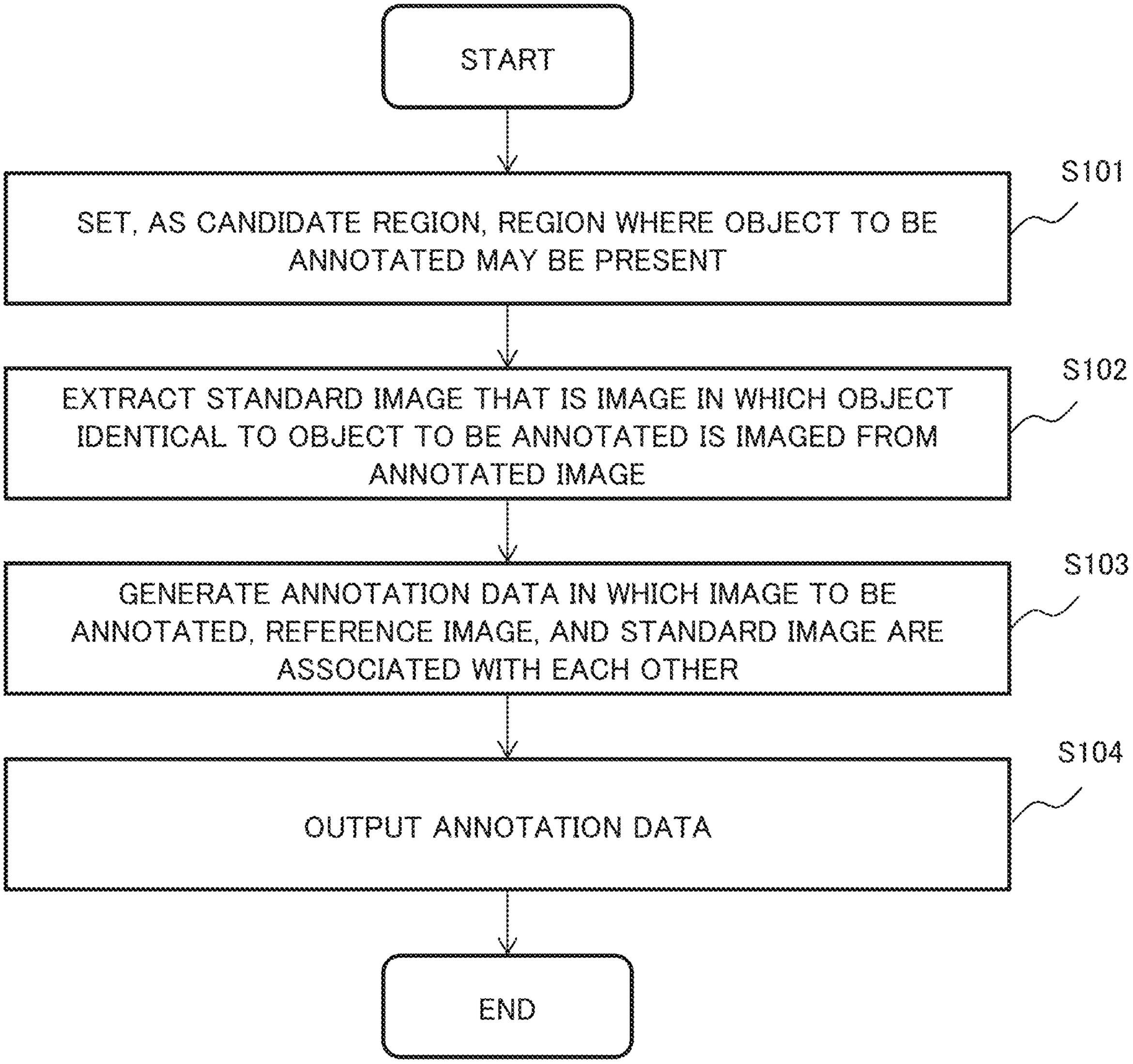
FIG. 18 is a diagram illustrating an example of an operation flow according to the second example embodiment of the present invention.

The operation of the image processing device 100 will be described. FIG. 18 is a diagram illustrating an example of an operation flow of the image processing device 100. The region setting unit 101 sets, as a candidate region, a region in which the object to be annotated may be present in the annotation target image (step S101). When the candidate region is set, the standard image extraction unit 102 extracts, from the annotated image, the standard image that is an image in which the object identical to the object to be annotated is imaged (step S102). When the standard image is extracted, the data generation unit 103 generates, as annotation data, data in which the annotation target image, the reference image captured at the time different from that of the annotation target image with respect to the region including the candidate region, and the standard image are associated with each other (step S103). When the annotation data is generated, the output unit 104 outputs the annotation data generated by the data generation unit 103 (step S104).

The image processing device 100 according to the present embodiment outputs, as annotation data, data in which an annotation target image, a reference image captured when a region including a candidate region is different from the annotation target image, and a standard image that is an annotated image are associated with each other. Therefore, by using the image processing device 100, the operator can perform processing while comparing the images at the time of performing annotation. As a result, by using the image processing device 100 of the present embodiment, it is possible to improve the accuracy while efficiently performing the annotation processing.

Figure 19:
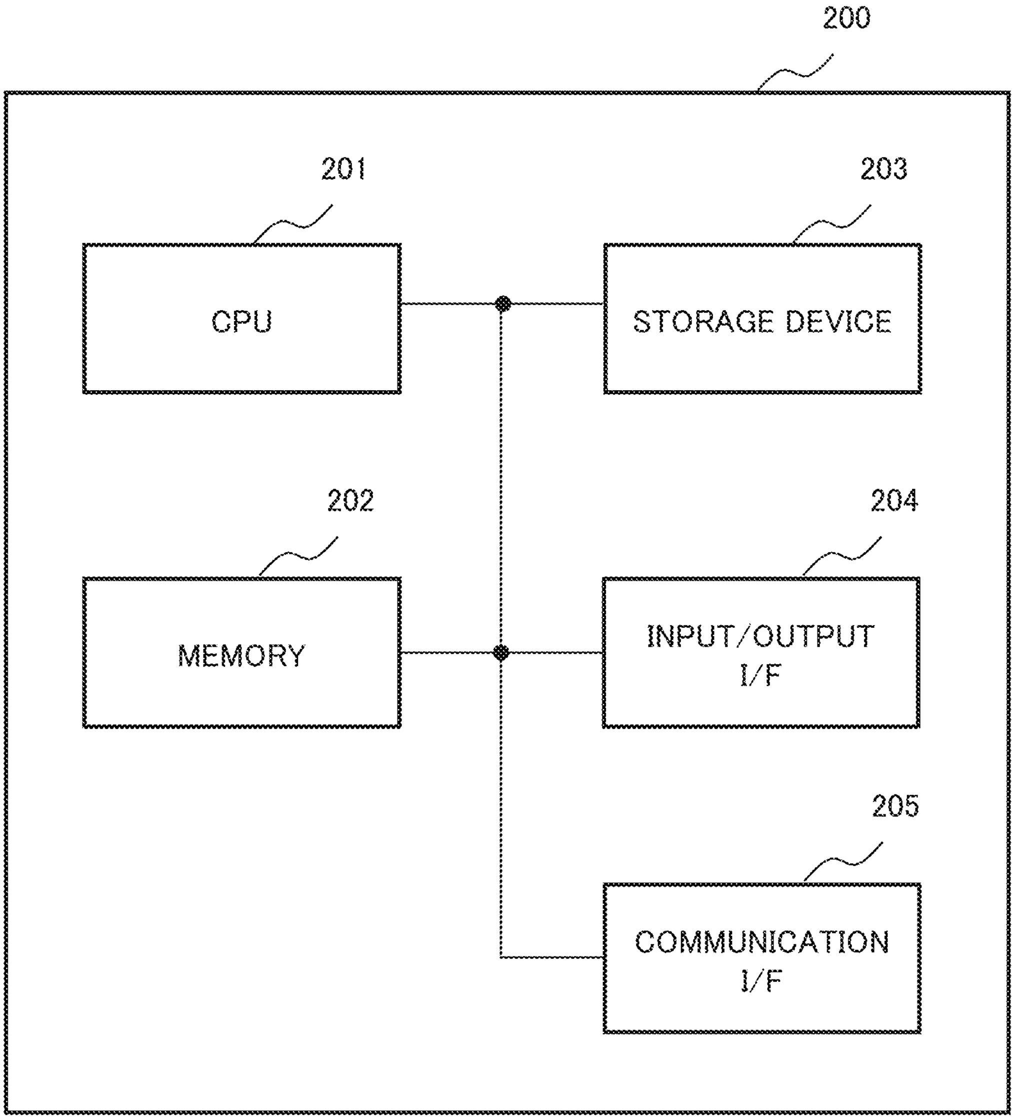
FIG. 19 is a diagram illustrating another configuration example of the example embodiment of the present invention.

Each processing in the image processing device 10 of the first example embodiment and the image processing device 100 of the second example embodiment can be performed by causing a computer to execute a computer program. FIG. 19 illustrates an example of a configuration of a computer 200 that executes a computer program for executing each processing in the image processing device 10 of the first example embodiment and the image processing device 100 of the second example embodiment. The computer 200 includes a central processing unit (CPU) 201, a memory 202, a storage device 203, an input/output interface (I/F) 204, and a communication I/F 205.

The CPU 201 reads and executes a computer program for executing each processing from the storage device 203. The CPU 201 may be configured by a combination of a CPU and a graphics processing unit (GPU). The memory 202 includes a dynamic random access memory (DRAM) or the like, and temporarily stores a computer program executed by the CPU 201 and data being processed. The storage device 203 stores a computer program executed by the CPU 201. The storage device 203 includes, for example, a nonvolatile semiconductor storage device. The storage device 203 may include another storage device such as a hard disk drive. The input/output I/F 204 is an interface that receives an input from an operator to output display data and the like. The communication I/F 205 is an interface that transmits and receives data to and from each device constituting the monitoring system. The terminal device 30 can have a similar configuration.

The computer program used for executing each processing can also be stored in a non-transitory recording medium and distributed. The recording medium may include, for example, a magnetic tape for data recording or a magnetic disk such as a hard disk. The recording medium may include an optical disk such as a compact disc read only memory (CD-ROM). A non-volatile semiconductor storage device may be used as a recording medium.

The present invention is described above by taking the above-described example embodiment as an example. However, the present invention is not limited to the above-described example embodiments. That is, it will be understood by those of ordinary skill in the art that the present invention can have various aspects without departing from the spirit and scope of the present invention as defined by the claims.

This application claims priority based on Japanese Patent Application No. 2021-158568 filed on Sep. 29, 2021, the entire disclosure of which is incorporated herein.

REFERENCE SIGNS LIST

10 image processing device
11 region setting unit
12 region extraction unit
13 standard image extraction unit
14 data generation unit
15 output unit
16 input unit
20 storage unit
21 target image storage unit
22 reference image storage unit
23 region information storage unit
24 annotation result storage unit
30 terminal device
100 image processing device
101 region setting unit
102 standard image extraction unit
103 data generation unit
104 output unit
200 computer
201 CPU
202 memory
203 storage device
204 input/output I/F
205 communication I/F

What is claimed is:

1. An image processing device comprising:
at least one memory storing instructions; and
at least one processor configured to access the at least one memory and execute the instructions to:
set, as a candidate region, a region in which an object to be annotated is likely to be present in an annotation target image captured by a synthetic aperture radar;
extract a standard image that is an image in which an object identical to the object to be annotated is imaged from an annotated image, captured by the synthetic aperture radar;
generate, as annotation data, data in which the annotation target image, a first reference image captured by the synthetic aperture radar on a different day from the annotation target image, a second reference image by the synthetic aperture radar on a different day from the annotation target image and the first reference image, and the standard image are associated with each other, wherein the first reference image and the second reference image are images of a region including the candidate region; and
output the generated annotation data.

2. The image processing device according to claim 1, wherein
the at least one processor is further configured to execute the instructions to:
receive, as annotation information, input of information related to annotation of the object to be annotated on the annotation target image; and
store, in a storage as annotation completion data, the annotation target image and the annotation information in association with each other.

3. The image processing device according to claim 2, wherein
the at least one processor is further configured to execute the instructions to:
store, in the storage, an image included in the annotation completion data and information about an imaging position of the image in association with each other; and
compare an image obtained by imaging a location identical to the candidate region among images stored in the storage with an image of the candidate region of the annotation target image to extract the standard image.

4. The image processing device according to claim 3, wherein
the at least one processor is further configured to execute the instructions to:
compare each image of the annotation completion data stored in the storage with the annotation target image to extract the standard image when an image obtained by imaging a location identical to the candidate region is not stored in the storage.

5. The image processing device according to claim 1, wherein
the at least one processor is further configured to execute the instructions to:
output, as the standard image, an image in which a determination result at a time of performing annotation is correct and an image in which the determination result is incorrect.

6. The image processing device according to claim 1, wherein
the at least one processor is further configured to execute the instructions to:
extract a first related image and a second related image, wherein the first related image and the second related image are images of a region related to the candidate region from the first reference image and the second reference image; and
output as the annotation data, data in which an image of the candidate region, the first related image, the second related image, and the standard image are associated with each other.

7. The image processing device according to claim 1, wherein
the at least one processor is further configured to execute the instructions to:
set a plurality of the candidate regions by sliding a position of the candidate region on the annotation target image.

8. The image processing device according to claim 1, wherein the at least one processor is further configured to execute the instructions to:

set the candidate region at a position where the object to be annotated is likely to be present based on map information and a type of the object to be annotated.

9. The image processing device according to claim 1, wherein the at least one processor is further configured to execute the instructions to:

generate the first reference image and the second reference image those include a region indicated by a line, the region is an area where an object exists in a candidate image but no object exists in a first related image and a second related image; and output the annotation data for recognizing a region where a movable object exists.

10. An image processing method executed by a computer, the image processing method comprising:

setting, as a candidate region, a region in which an object to be annotated is likely to be present in an annotation target image captured by a synthetic aperture radar;

extracting a standard image that is an image in which an object identical to the object to be annotated is imaged from an annotated image, captured by the synthetic aperture radar;

generating, as annotation data, data in which the annotation target image, a first reference image captured by the synthetic aperture radar on a different day from the annotation target image, a second reference image by the synthetic aperture radar on a different day from the annotation target image and the first reference image, and the standard image are associated with each other, wherein the first reference image and the second reference image are images of a region including the candidate region; and outputting the generated annotation data.

11. The image processing method according to claim 10, further comprising:

receiving, as annotation information, input of information related to annotation of the object to be annotated on the annotation target image; and storing, in a storage as annotation completion data, the annotation target image and the annotation information in association with each other.

12. The image processing method according to claim 11, further comprising:

storing, in the storage, an image included in the annotation completion data and information about an imaging position of the image in association with each other; and comparing an image obtained by imaging a location identical to the candidate region among images stored in the storage with an image of the candidate region of the annotation target image to extract the standard image.

13. The image processing method according to claim 12, further comprising:

comparing each image of the annotation completion data stored in the storage with the annotation target image to extract the standard image when an image obtained by imaging a location identical to the candidate region is not stored in the storage.

14. The image processing method according to claim 10, further comprising:

outputting, as the standard image, an image in which a determination result at a time of performing annotation is correct and an image in which the determination result is incorrect.

15. The image processing method according to claim 10, further comprising:

extracting a first related image and a second related image, wherein the first related image and the second related image are images of a region related to the candidate region from the first reference image and the second reference image; and outputting as the annotation data, data in which an image of the candidate region, the first related image, the second related image, and the standard image are associated with each other.

16. The image processing method according to claim 10, further comprising:

setting a plurality of the candidate regions by sliding a position of the candidate region on the annotation target image.

17. The image processing method according to claim 10, further comprising:

setting the candidate region at a position where the object to be annotated is likely to be present based on map information and a type of the object to be annotated.

18. A non-transitory recording medium that records an image processing program for causing a computer to execute the steps of:

setting, as a candidate region, a region in which an object to be annotated is likely to be present in an annotation target image captured by a synthetic aperture radar;

extracting a standard image that is an image in which an object identical to the object to be annotated is imaged from an annotated image, captured by the synthetic aperture radar;

generating, as annotation data, data in which the annotation target image, a first reference image captured by the synthetic aperture radar on a different day from the annotation target image, a second reference image by the synthetic aperture radar on a different day from the annotation target image and the first reference image, and the standard image are associated with each other, wherein the first reference image and the second reference image are images of a region including the candidate region; and outputting the generated annotation data.

19. The non-transitory recording medium that records the image processing program according to claim 18, wherein the image processing program further causing the computer to execute the steps of:

receiving, as annotation information, input of information related to annotation of the object to be annotated on the annotation target image; and storing, in a storage as annotation completion data, the annotation target image and the annotation information in association with each other.

20. The non-transitory recording medium that records the image processing program according to claim 19, wherein the image processing program further causing the computer to execute the steps of:

storing, in the storage, an image included in the annotation completion data and information about an imaging position of the image in association with each other; and comparing an image obtained by imaging a location identical to the candidate region among images stored in the storage with an image of the candidate region of the annotation target image to extract the standard image.

* * * * *